United States Patent
Winger et al.

(10) Patent No.: US 7,072,399 B2
(45) Date of Patent: Jul. 4, 2006

(54) MOTION ESTIMATION METHOD AND SYSTEM FOR MPEG VIDEO STREAMS

(75) Inventors: Lowell Winger, Waterloo (CA); Simon Booth, Kitchener (CA); Michael Gallant, Guelph (CA); Eric Pearson, Conestogo (CA)

(73) Assignee: LSI Logic Corporation, Milpitas, CA (US)

( * ) Notice: Subject to any disclaimer, the term of this patent is extended or adjusted under 35 U.S.C. 154(b) by 721 days.

(21) Appl. No.: 10/196,731

(22) Filed: Jul. 17, 2002

(65) Prior Publication Data

US 2004/0013199 A1    Jan. 22, 2004

(51) Int. Cl.
*H04B 1/66*    (2006.01)
*H04N 7/12*    (2006.01)
(52) U.S. Cl. .................................. 375/240.16
(58) Field of Classification Search ........... None
See application file for complete search history.

(56) References Cited

U.S. PATENT DOCUMENTS

| 5,598,514 | A |   | 1/1997 | Purcell |
| 5,604,540 | A |   | 2/1997 | Howe |
| 5,761,398 | A |   | 6/1998 | Legall |
| 5,872,604 | A | * | 2/1999 | Ogura ................. 348/699 |
| 6,014,181 | A | * | 1/2000 | Sun ..................... 348/699 |
| 6,380,986 | B1 | * | 4/2002 | Minami et al. ....... 348/699 |
| 6,563,872 | B1 | * | 5/2003 | Suzuki .............. 375/240.03 |
| 6,591,015 | B1 | * | 7/2003 | Yasunari et al. ....... 382/236 |
| 6,842,483 | B1 | * | 1/2005 | Au et al. ........... 375/240.16 |

OTHER PUBLICATIONS

Article—Complexity and PSNR-Comparison of several Fast Motion estimation Algorithms for MPEG-4.
Article—A 1.2—W Single-Chip MPEG2 by Eiji Ogura et al-pp. 1765-1771-IEEE Journal of Solid-State Circuits, vol. 33, No. 11, Nov. 1998.

* cited by examiner

Primary Examiner—Nhon Diep
(74) Attorney, Agent, or Firm—Christopher P. Maiorana, PC

(57) ABSTRACT

The present invention discloses a motion estimation method for MPEG video sequences. The method makes use of a global motion estimation algorithm to determine a set of dominant motion components. A simultaneous Full Search Block Matching (FSBM) search is conducted utilizing each dominant component for every block in a current frame. The results of each FSBM search are then compared to determine the best motion vector.

20 Claims, 10 Drawing Sheets

MOTION ESTIMATION METHOD AND SYSTEM FOR MPEG VIDEO STREAMS

BACKGROUND OF THE INVENTION

Throughout this specification we will be using the term MPEG as a generic reference to a family of international standards set by the Motion Picture Expert Group. MPEG reports to sub-committee 29 (SC29) of the Joint Technical Committee (JTC1) of the International Organization for Standardization (ISO) and the International Electro-technical Commission (IEC).

Throughout this specification the term H.26x will be used as a generic reference to a closely related group of international recommendations by the Video Coding Experts Group (VCEG). VCEG addresses Question 6 (Q.6) of Study Group 16 (SG16) of the International Telecommunications Union Telecommunication Standardization Sector (ITU-T). These standards/recommendations specify exactly how to represent visual and audio information in a compressed digital format. They are used in a wide variety of applications, including DVD (Digital Video Discs), DVB (Digital Video Broadcasting), Digital cinema, and videoconferencing.

Throughout this specification the term MPEG/H.26x will refer to the superset of MPEG and H.26x standards and recommendations.

There are several existing major MPEG/H.26x standards: H.261, MPEG-1, MPEG-2/H.262, MPEG4/H.263. Among these, MPEG-2/H.262 is clearly most commercially significant, being sufficient in many applications for all the major TV standards, including NTSC (National Standards Television Committee) and HDTV (High Definition Television). Of the series of MPEG standards that describe and define the syntax for video broadcasting, the standard of relevance to the present invention is the draft standard ITU-T Recommendation H.264, ISO/IEC 14496-10 AVC, which is incorporated herein by reference and is hereinafter referred to as "MPEG-AVC/H.264".

A feature of MPEG/H.26x is that these standards are often capable of representing a video signal with data roughly $1/50^{th}$ the size of the original uncompressed video, while still maintaining good visual quality. Although this compression ratio varies greatly depending on the nature of the detail and motion of the source video, it serves to illustrate that compressing digital images is an area of interest to those who provide digital transmission.

MPEG/H.26x achieves high compression of a video signal through the successive application of five basic mechanisms:

1) Storing the luminance (black & white) detail of the video signal with more horizontal and vertical resolution than the two chrominance (colour) components of the video.
2) Storing only the differences from one area of a video frame to another area of the same frame, thus removing spatially redundant information from a video signal.
3) Storing only the differences from one video frame to another, thus removing temporally redundant information from a video signal.
4) Storing these differences with reduced fidelity, as quantized transform coefficient symbols, to trade-off a reduced number of bits per symbol with increased video distortion.
5) Storing all the symbols representing the compressed video with entropy encoding, to reduce the number of bits per symbol without introducing any additional video signal distortion.

Mechanisms 2) and 3) are accomplished by defining a predicted value for each pixel in a video frame, based on previous and future video frames in a sequence of video frames. The aggregation of these predicted pixel values is referred to as a predicted frame.

The MPEG-AVC/H.264 standard defines a syntax that allows the transmission of prediction parameters that fully describe how to generate the predicted frame from previous and future frames. The MPEG-AVC/H.264 standard also defines the syntax for describing the difference of a video frame from the predicted frame. In general, it is possible to create a predicted frame whereby far fewer bits are required to transmit the prediction parameters and the difference from the predicted frame, than would be required to transmit each pixel value from the original video frame.

Conceptually, the prediction parameters defined in the MPEG-AVC/H.264 standard can be thought of as describing the motion of objects within a sequence of video frames from one frame to the next. The process by which the best prediction parameters are determined is called motion estimation.

This invention addresses an improved method and system to perform motion estimation for MPEG video streams.

SUMMARY OF THE INVENTION

The present invention is directed to a method of motion estimation, the method comprising the steps of:
a) acquiring current frame and reference frame pixel data;
b) creating a plurality of dominant motion components;
c) searching within a plurality of search windows, one search window for each dominant motion component, for a block in a current frame;
d) determining the best result from step c); and
e) repeating steps c) and d) for each block in said current frame.

Wherein step b) comprises the steps of:
i) sub-sampling said current frame to create a plurality of first sub-sampled blocks and sub-sampling said reference frame to create a plurality of second sub-sampled blocks;
ii) comparing each first sub-sampled block with each second sub-sampled block to determine a best match and storing said best match; and
iii) analyzing each said best match to determine said dominant motion components.

The present invention is directed to a system for motion estimation, the system comprising:
a) means for acquiring current frame and reference frame pixel data;
b) means for creating a plurality of dominant motion components;
c) means for searching within a plurality of search windows, one search window for each dominant motion component, for a block in a current frame;
d) means for determining the best result from step c); and
e) means for repeating steps c) and d) for each block in said current frame.

Wherein the means for creating a plurality of dominant motion components; further comprises:
i) means for sub-sampling said current frame to create a plurality of first sub-sampled blocks and means for sub-sampling said reference frame to create a plurality of second sub-sampled blocks;
ii) means for comparing each first sub-sampled block with each second sub-sampled block to determine a best match and storing said best match; and iii) means for analyzing each said best match to determine said dominant motion components.

The present invention is further directed to a computer readable medium said medium comprising:
a) instructions for acquiring current frame and reference frame pixel data;
b) instructions for creating a plurality of dominant motion components;
c) instructions for searching within a plurality of search windows, one search window for each dominant motion component, for a block in a current frame;
d) instructions for determining the best result from step c); and
e) instructions for repeating steps c) and d) for each block in said current frame.

Wherein the instructions for creating a plurality of dominant motion components further comprises:
i) instructions for sub-sampling said current frame to create a plurality of first sub-sampled blocks and instructions for sub-sampling said reference frame to create a plurality of second sub-sampled blocks;
ii) instructions for comparing each first sub-sampled block with each second sub-sampled block to determine a best match and storing said best match; and
iii) instructions for analyzing each said best match to determine said dominant motion components.

DETAILED DESCRIPTION OF THE INVENTION

Figure 1:
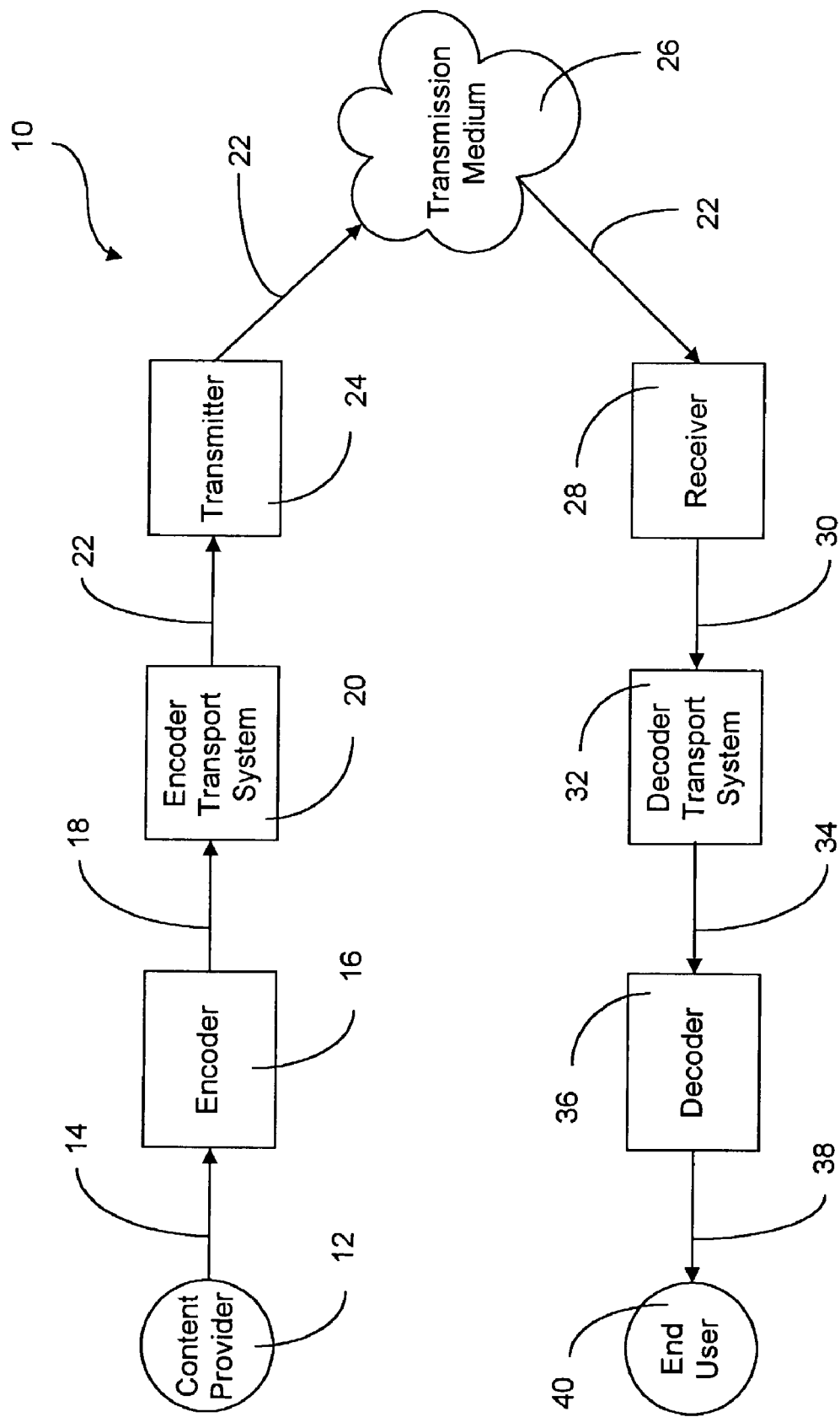
FIG. 1 is a block diagram of a video transmission and receiving system.

By way of introduction we refer first to FIG. 1, a video transmission and receiving system, is shown generally as 10. A content provider 12 provides a video source 14 to an encoder 16. A content provider may be anyone of a number of sources but for the purpose of simplicity one may view video source 14 as originating from a television transmission, be it analog or digital. Encoder 16 receives video source 14 and utilizes a number of compression algorithms to reduce the size of video source 14 and passes an encoded stream 18 to encoder transport system 20. Encoder transport system 20 receives stream 18 and restructures it into a transport stream 22 acceptable to transmitter 24. Transmitter 24 then distributes transport stream 22 through a transport medium 26 such as the Internet or any form of network enabled for the transmission of MPEG data streams.

Receiver 28 receives transport stream 22 and passes it as received stream 30 to decoder transport system 32. In a perfect world, steams 22 and 30 would be identical. Decoder transport system 32 processes stream 30 to create a decoded stream 34. Once again, in a perfect world streams 18 and 34 would be identical. Decoder 36 then reverses the steps applied by encoder 16 to create output stream 38 that is delivered to the user 40.

An MPEG video transmission is essentially a series of pictures taken at closely spaced time intervals. In the MPEG/H.26x standards, a picture is referred to as a "frame", and a "frame" is completely divided into rectangular sub-partitions known as "picture blocks", with associated "motion vectors". Often a picture may be quite similar to the one that precedes it or the one that follows it. For example, a video of waves washing up on a beach would change little from picture to picture. Except for the motion of the waves, the beach and sky would be largely the same. Once the scene changes, however, some or all similarity may be lost. The concept of compressing the data in each picture relies upon the fact that many images often do not change significantly from picture to picture, and that if they do the changes are often simple, such as image pans or horizontal and vertical block translations. Thus, transmitting only block translations (known as "motion vectors") and differences between picture blocks, as opposed to the entire picture, can result in considerable savings in data transmission.

Usually motion vectors are predicted, such that they are represented as a difference from their predictor, known as a predicted motion vector residual. In practice, the pixel differences between picture blocks are transformed into frequency coefficients, and then quantized to further reduce the data transmission. Quantization allows the frequency coefficients to be represented using only a discrete number of levels, and is the mechanism by which the compressed video becomes a "lossy" representation of the original video. This process of transformation and quantization is performed by an encoder.

Figure 2:
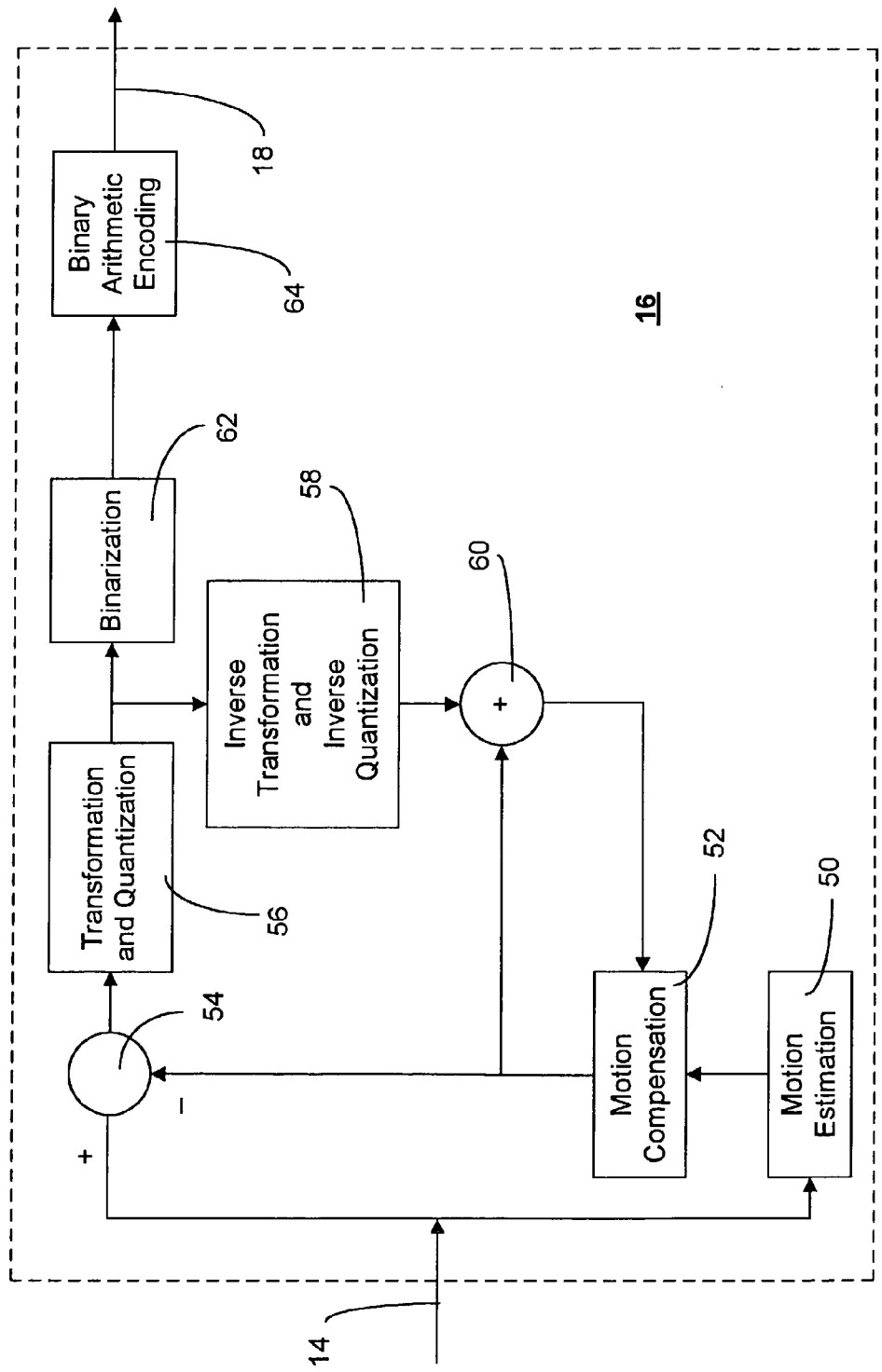
FIG. 2 is a block diagram of an encoder.

Referring now to FIG. 2 a block diagram of an encoder is shown generally as 16. Encoder 16 accepts as input video source 14. Video source 14 is passed to motion estimation module 50, which determines the motion difference between frames. Motion estimation module 50 is where the present invention resides. The output of motion estimation module 50 is passed to motion compensation module 52. At combination module 54, the output of motion compensation module 52 is subtracted from the input video source 14 to create input to transformation and quantization module 56. Output from motion compensation module 52 is also provided to module 60. Module 56 transforms and quantizes output from module 54. The output of module 56 may have to be recalculated based upon prediction error, thus the loop comprising modules 52, 54, 56, 58 and 60. The output of module 56 becomes the input to inverse transformation module 58. Module 58 applies an inverse transformation and an inverse quantization to the output of module 56 and provides that to module 60 where it is combined with the output of module 52 to provide feedback to module 52.

With regard to the above description of FIG. 2, those skilled in the art will appreciate that the functionality of the modules illustrated are well defined in the MPEG family of standards. Further, numerous variations of modules of FIG. 2 have been published and are readily available.

The MPEG-AVC/H.264 standard addresses many of the important issues relating to the exploitation of redundancies in video. The algorithms used to encode an MPEG-AVC/H.264 stream take advantage of both spatial and temporal redundancies in the video sequence. Spatial redundancy occurs when picture elements (pixels) are replicated within the same video frame. Temporal redundancy occurs when pixels are replicated in one or more successive video frames. The ability of an MPEG-AVC/H.264 video encoder to exploit temporal redundancy is what provides much of its compression efficiency.

Each frame of a video sequence can be encoded as one of two types—an Intra frame or an Inter frame. Intra frames (I frames) are encoded in isolation from other frames, compressing data based on similarity within a region of a single frame. Inter frames are coded based on similarity a region of one frame and a region of a successive frame.

In its simplest form, an inter frame can be thought of as encoding the difference between two successive frames. Consider two frames of a video sequence of waves washing up on a beach. The areas of the video that show the sky and the sand on the beach do not change, while the area of video where the waves move does change. An inter frame in this sequence would contain only the difference between the two frames. As a result, only pixel information relating to the waves would need to be encoded, not pixel information relating to the sky or the beach.

An inter frame is encoded by generating a predicted value for each pixel in the frame, based on pixels in previously encoded frames. The aggregation of these predicted values is called the predicted frame. The difference between the original frame and the predicted frame is called the residual frame. The encoded inter frame contains information about how to generate the predicted frame utilizing the previous frames, and the residual frame. In the example of waves washing up on a beach, the predicted frame is the first frame, and the residual frame is the difference between the two frames.

In the MPEG-AVC/H.264 standard, there are two types of inter frames predictive frames (P frames) are encoded based on a predictive frame created from one or more frames that occur earlier in the video sequence. Bi-directional predictive frames (B frames) are based on predictive frames that are generated from frames either earlier or later in the video sequence.

Figure 3:
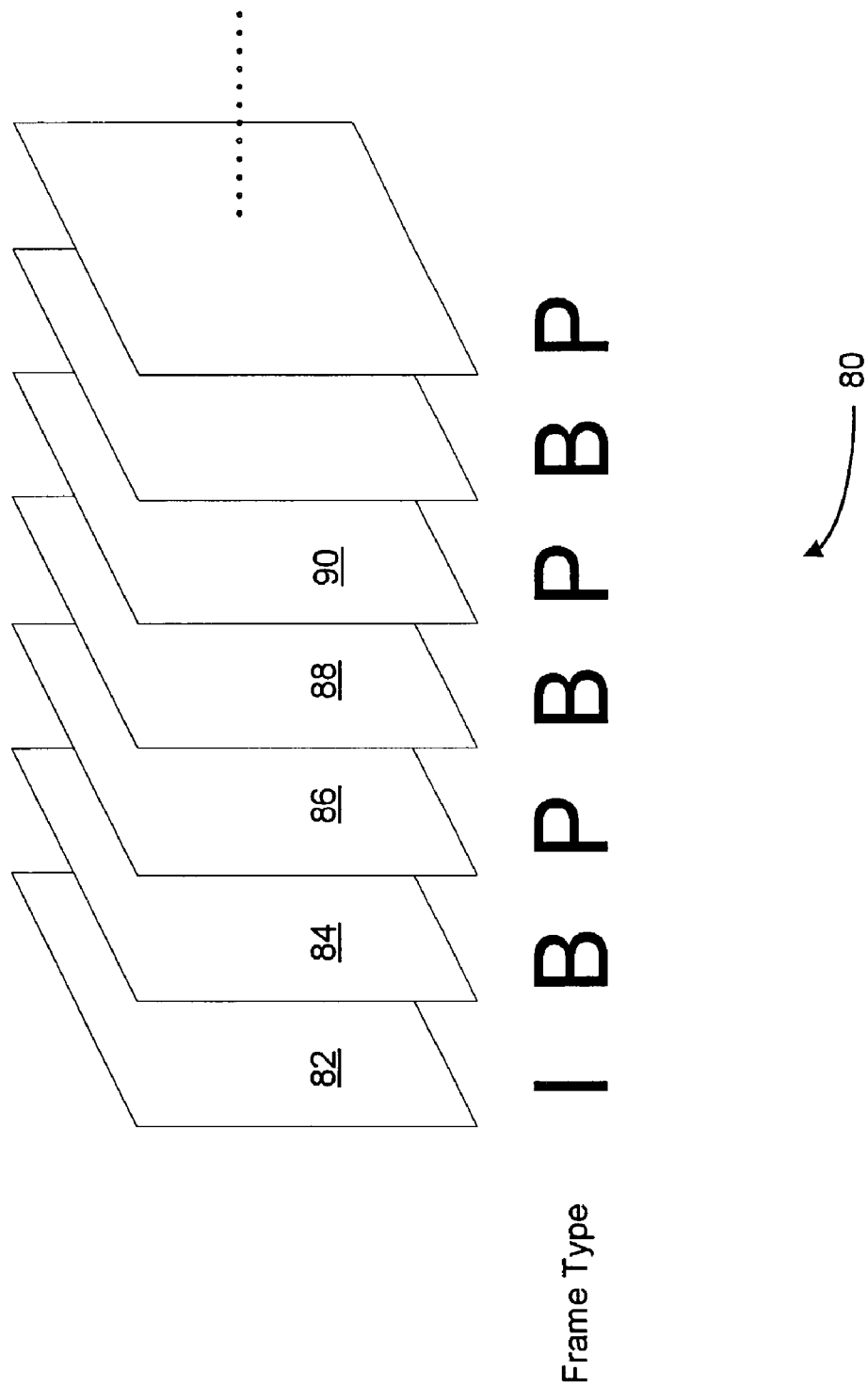
FIG. 3 is a schematic diagram of a series of video frames.

Referring now to FIG. 3, a schematic diagram of a series of video frames is shown generally as 80. FIG. 3 shows a typical frame type ordering of a video sequence. P frames are predicted from earlier P or I frames. In FIG. 3, third frame 86 would be predicted from first frame 82. Fifth frame 90 would be predicted from frame 86 and/or frame 82. B frames are predicted from earlier and later I or P frames. Frame 84 being a B frame, can be predicted from frame 82 and frame 86.

In MPEG-AVC/H.264, pixel values are predicted from previous frames through block-based motion compensation. In block-based motion compensation the frame being encoded is the current frame; the frame(s) from which the prediction for the current frame is being estimated is the reference frame(s).

In block-based motion compensation, each current frame is divided into rectangular blocks of pixels. MPEG-AVC/H.264 allows several different block sizes, but the most commonly used size is 16×16, also called a macroblock. For each such block in the current frame, a predicted block of the same size in the reference frame that has similar pixel values is identified. This block in the reference frame is used as the prediction for the pixels of the block in the current frame. The encoded video steam will then contain motion information that describes the locations of the predicted blocks in the reference frame and pixel information describing the differences between the blocks in the current frame and the predicted blocks. Since the number of bits required to encode the motion information and the prediction residual is on average much less than the number of bits required to encode the original pixel information, block-based motion compensation is vital to the coding efficiency of the H.264 standard.

The coding efficiency achieved through block-based motion compensation is dependent on accurate motion estimation. Motion estimation is the process by which blocks in the reference frame are chosen to be predicted blocks. Typically, motion estimation is performed through a process called block matching. The block in the current frame will be compared to a set of blocks in the reference frame, and a cost estimate is calculated for each block. Each block in the reference frame has a corresponding candidate motion vector that defines the difference of its location in the reference to the location of the block in the current frame. The block that results in the lowest cost estimate is chosen as the predicted block.

The cost estimate used for block matching is typically based on a distortion measure, which quantifies the difference between the block in the current frame and the block in the reference frame. The most commonly used distortion is the Sum of Absolute Differences (SAD), but many other applicable distortion measures exist and are often used in block matching motion estimation algorithms. The cost estimate can also be based on factors, other than the difference between the current and reference blocks, which can affect the rate or quality of the encoded video stream. For example, the cost function can incorporate a penalty based on the estimated required number of bits to encode the prediction parameters for the block.

Figure 4:
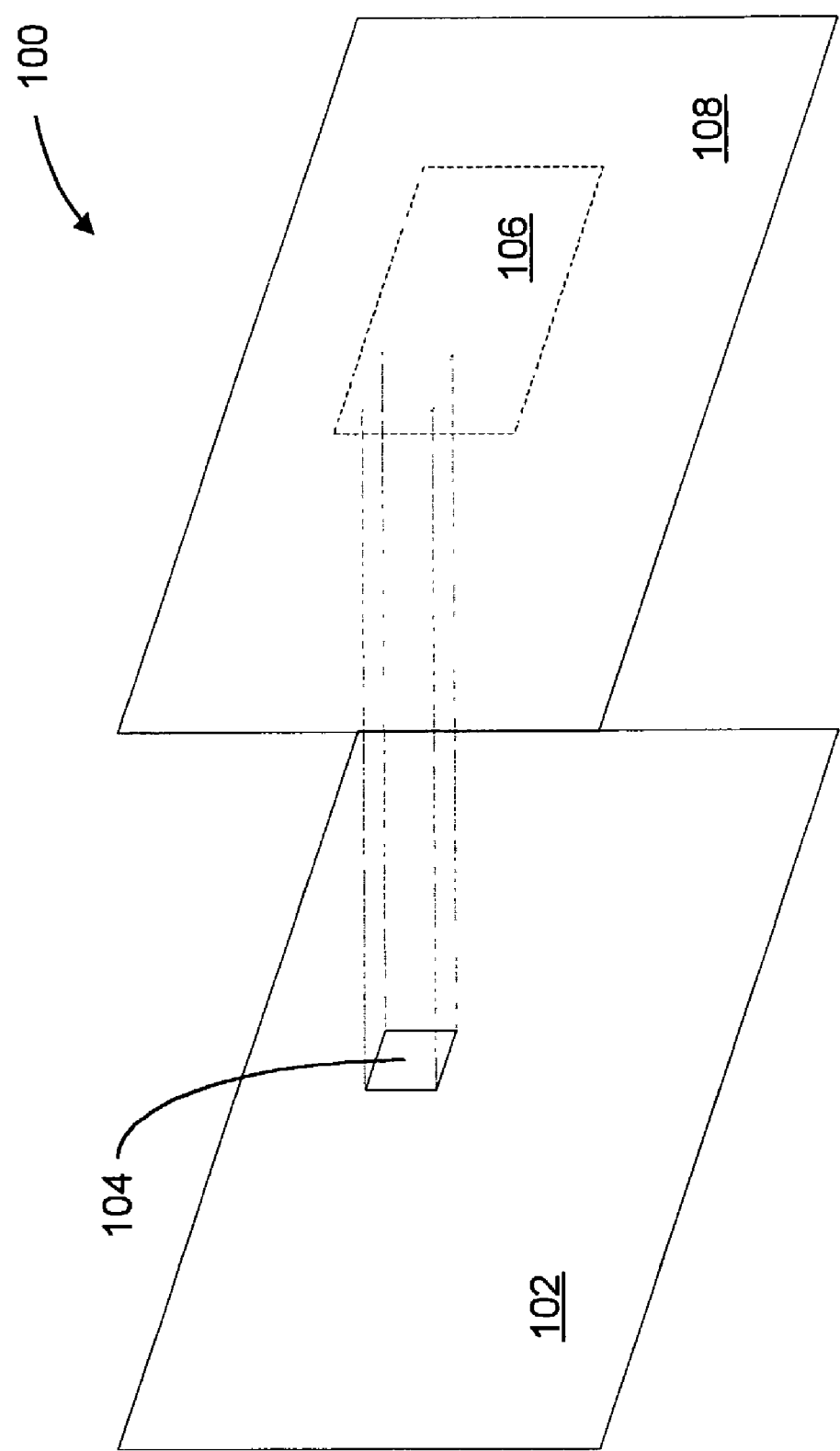
FIG. 4 is a schematic diagram of a current frame and a reference frame.

Computational resources make it infeasible to perform this block matching with every block in the reference frame, so a subset of blocks from the reference frame must be chosen for block matching. The simplest and most common algorithm for block matching is called Full Search Block Matching (FSBM). Although the preferred embodiment of the present invention makes use of FSBM for block matching, it is not the intent of the inventors to restrict the invention to the use of FSBM. Any block matching algorithm may be used as determined by the implementor. Referring now to FIG. 4, a schematic diagram of a current frame and a reference frame is shown generally as 100. Current frame 102 contains a current block 104. In FSBM, a search window 106 is defined in reference frame 108 for each current block 104. Every block within search window 106 is tested against current block 104.

Figure 5:
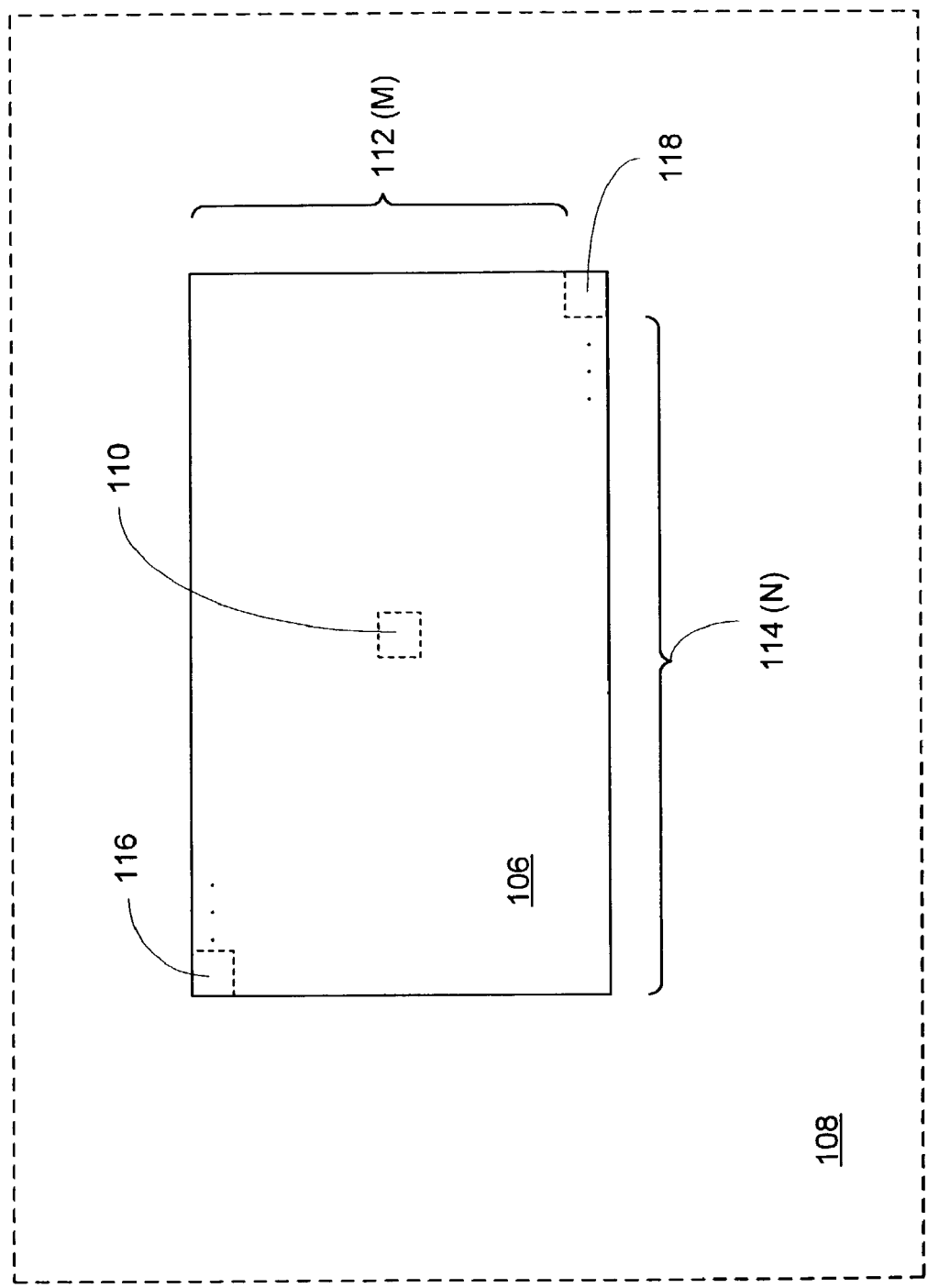
FIG. 5 is a plan view of a search window.

FIG. 5 is a plan view of a search window. Search window 106 is contained within reference frame 108. In search window 106 the position of a block is the pixel position of the top left corner of the block. Search window 106 has a centre position at the block that has its top left pixel at (x0, y0) shown as feature 110. Search window 106 has a vertical size of M (feature 112) and a horizontal size of N (feature 114). Search window 106 contains every block whose top left pixel lies within the rectangular area with corners: (x0−N, y0−M), (x0+N, y0−M), (x0−N, y0+M), and (x0+N, y0+M). First search position 116 and last search position 118 illustrate the range of blocks within search window 106.

Figure 6:
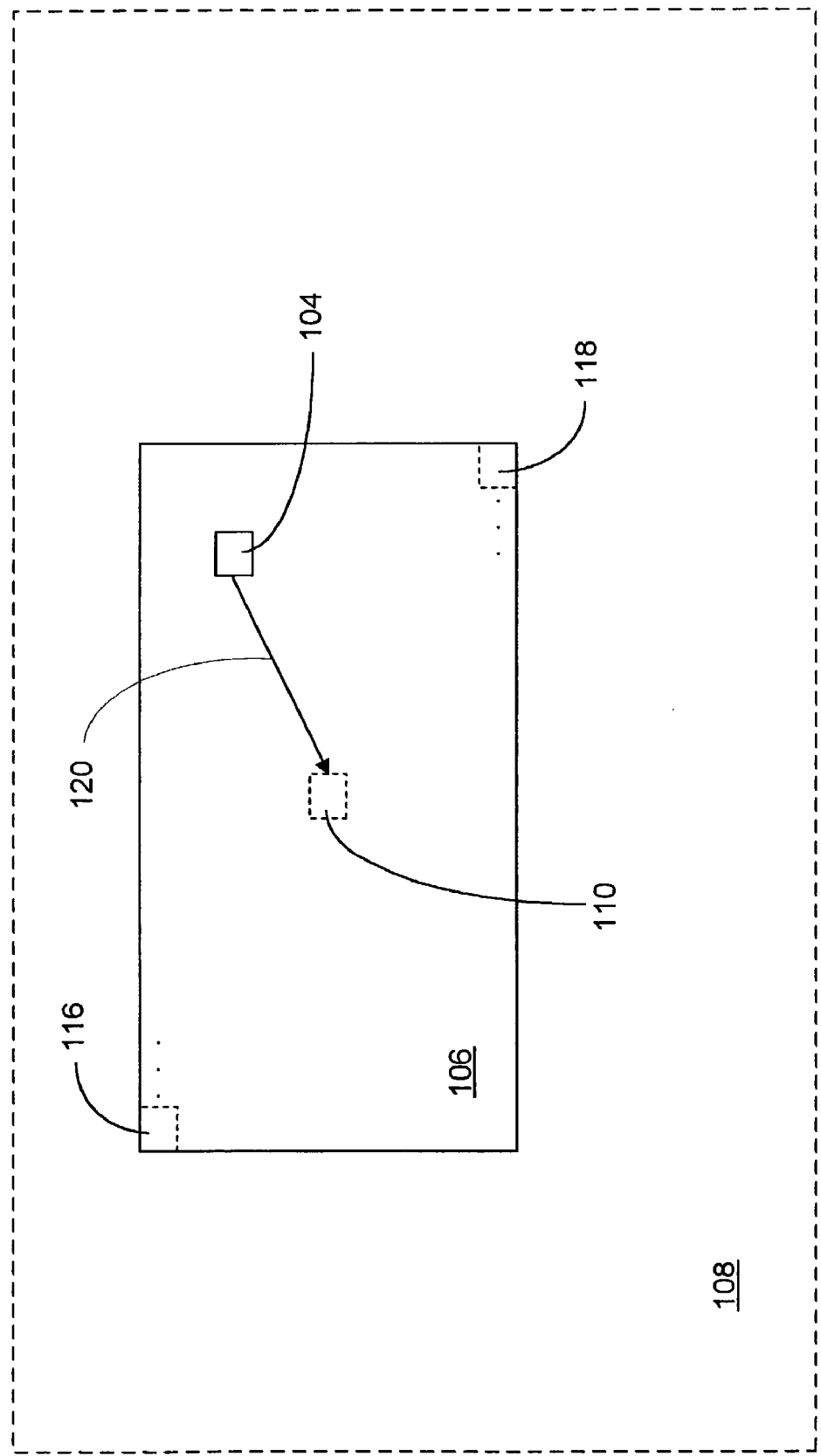
FIG. 6 is a plan view of a search window illustrating the offset between the central block of a search window and the corresponding block in the current frame.

FIG. 6 is a plan view of a search window illustrating the offset between the central block of a search window and a current block in the current frame 102. Search window 106 has a centre position 110 relative to current block 104, as determined by search window offset 120 defined by the horizontal and vertical components of the offset (off_x, off_y). The placement of search window 106 in reference frame 108 is a factor in both the coding performance of an encoder and the computational efficiency.

One common approach to the placement of a FSBM search window 106 is to centre it in reference frame 108, based upon the position of the current block 104. In this case (off_x, off_y)=(0,0) for all blocks. A FSBM algorithm using this co-located search window placement method leads to a very efficient hardware implementation that can take advantage of the regular and predictable memory access requirements inherent in this algorithm. The disadvantage of this method is that for sequences with high motion, a large search window may be required for satisfactory encoding efficiency, which adds to the computational resource requirements of the motion search, and ultimately the cost of implementation.

Consider a video sequence of a bus driving along an empty city street. If the bus is moving slowly the co-located approach described above will work well, as a search through a reasonably sized search window will be able to identify the motion of the relatively still background and the slow moving bus. If the bus is moving quickly, it is likely that a reasonably sized search window would be inadequate to capture the motion of the bus. In either case, the blocks of pixels that comprise the bus will have similar motion characteristics. Motion characteristics are a set of parameters utilized to determine where current block 104 may appear within reference frame 108. This tendency for spatially neighboring pixel blocks to have similar motion characteristics is typical of most video sequences.

Search window placement methods that take advantage of the relationship of the motion characteristics of spatially neighboring blocks are able to obtain satisfactory motion compensation results using a much smaller search window than the co-located search window approach. However, these methods typically require the use of the motion estimation results of spatially neighboring block in determining the best placement for a search window. This adversely affects the suitability of the motion estimator for pipelined hardware architecture, since motion estimation for one block must be complete before motion estimation for the next block can be started. Also, these methods imply less regular and predictable memory accesses, hence requiring greater memory bandwidth.

Consider again the video sequence of the bus driving along a city street. In this sequence, the motion characteristics for each block would likely fall into one of two groups: one group corresponding to the background, and one group corresponding to the motion of the bus. If there were other vehicles in the video sequence, moving in different directions or at different speeds, other groups of pixel blocks with similar motion characteristics would be present.

The present invention includes a method and system for motion estimation that utilizes multiple independent full search block matching searches. The present invention searches for each of the predominant motion characteristics between two frames of a video sequences. In order to conduct such a search the present invention identifies the predominant motion characteristics for a frame of a video sequence. The present invention includes a block matching cost function that uses the information gained from identifying the dominant motion characteristics.

What follows is a description of a multiple full search motion estimation process, followed by a description of a particular method used to identify the predominant motion characteristics for each frame, which we refer to as Global Motion Estimation.

Figure 7:
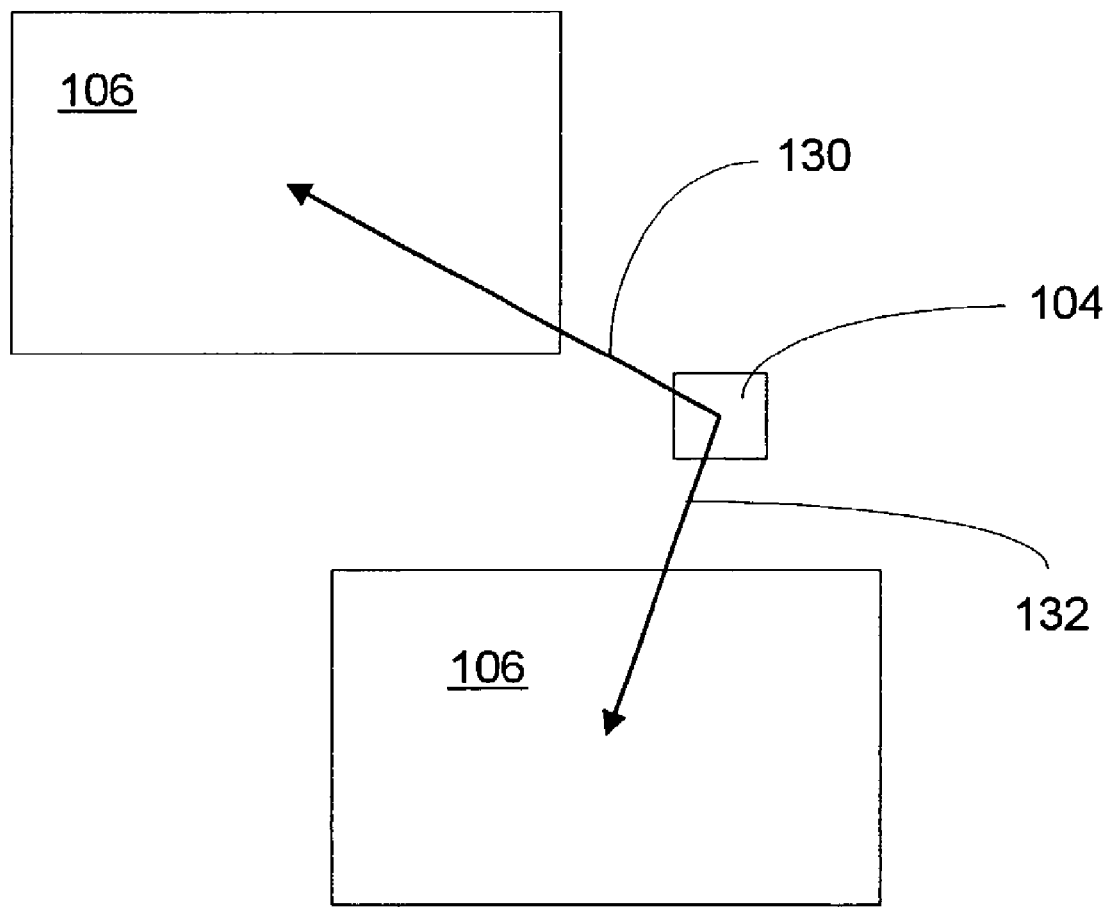
FIG. 7 is a plan view illustrating the use of two offset vectors.

The motion estimation process comprises the following steps:
1) Acquiring current and reference frame pixel data
2) Performing Global Motion Estimation (described below) to identify two dominant motion components, GDX0 and GDX1;
3) Performing two simultaneous FSBM searches for a first block in the current frame using each GDX0 and GDX1 to place search windows. The search window offset for one FSBM process is GDX0 for every block 104 in the current frame and the search window offset for the second FSBM process is GDX1 for every block 104 in the current frame. This is illustrated in FIG. 7 where GDX0 is shown as feature 130 and GDX1 as feature 132.

As described earlier, one defining characteristic of a block matching algorithm (including FSBMs) is the cost function used to evaluate each block in the reference frame. The cost function used for this method includes a measure of the distortion between the block in the current frame and the block in the search window of the reference frame, and a penalty based on the candidate motion vector and the results of the Global Motion Estimation method. The form of the block matching cost function is:

$$Cost=Distortion+MotionVectorPenalty$$

The preferred distortion measure is the SAD, but any other distortion measure is appropriate. The preferred motion vector penalty for each search window is a mathematical function of the absolute difference between the candidate motion vector and the dominant motion component associated with the search window. Any other penalty based a candidate motion vector and the dominant motion components or any other information obtained though the Global Motion Estimation is equally appropriate for use in the block matching cost function.
4) Compare bests results from each FSBM search to choose the best resultant motion vector, according to the associated cost estimates as defined above;
5) Repeat steps 3 and 4 for every block 104 in current frame 102.

Figure 8:
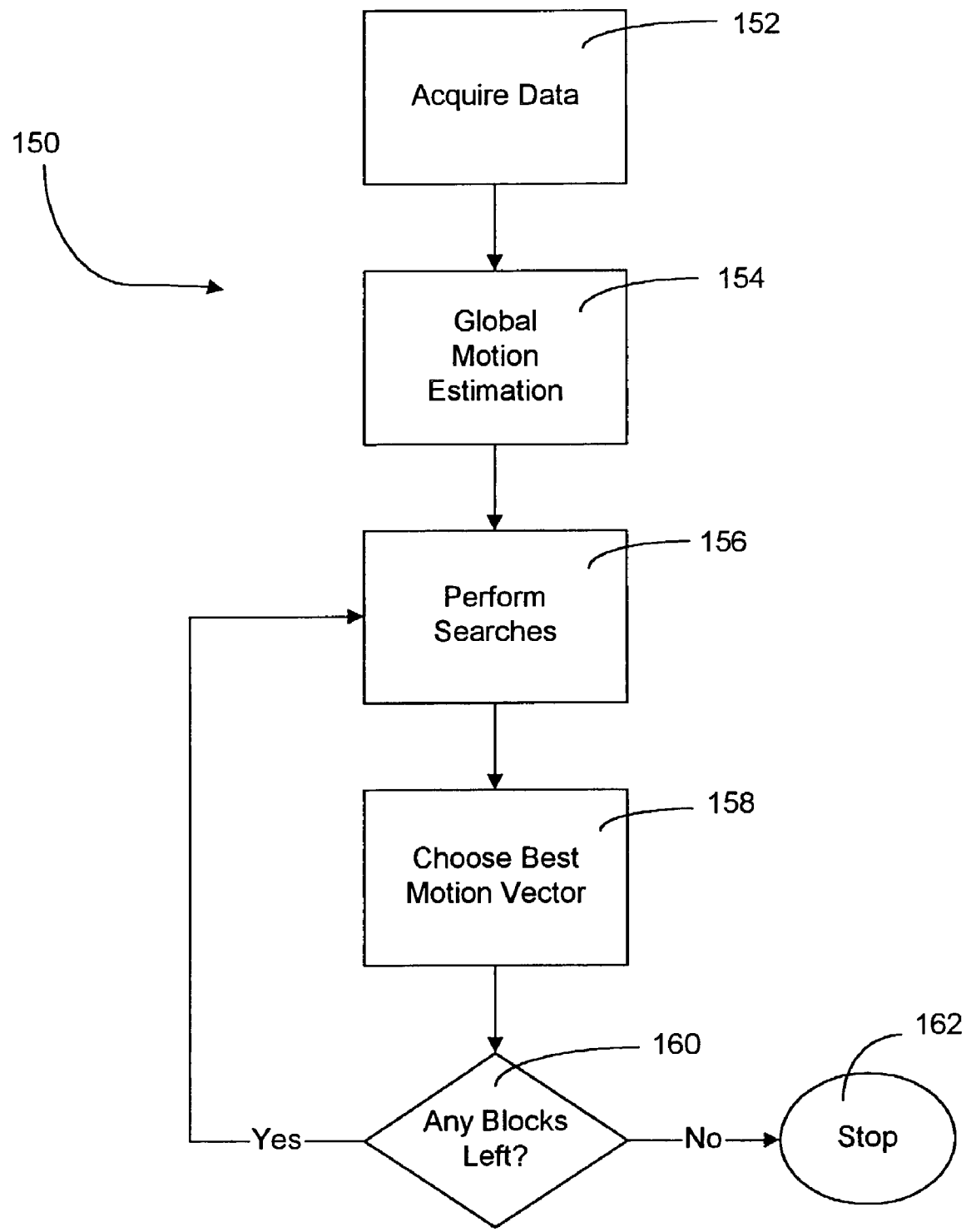
FIG. 8 is a flowchart of the motion estimation process.

Referring now to FIG. 8 a flowchart of the motion estimation process is shown generally as 150. In process 150, steps 152, 154, 156, 158 and 160 correspond to steps 1, 2, 3, 4 and 5 described above.

Although the above description of the motion estimation process makes reference to two motion components GDX0 and GDX1, the process may make use of any number of motion components and search windows.

While the placement of the FSBM windows are guided by a prediction of motion, the search window offsets are constant for all blocks in the current frame. Each FSBM process has all of the implementation benefit of the co-located search window approach as regular and predictable memory access requirements enable an implementation with lower memory bandwidth. While enabling these implementation efficiencies, the present invention provides the coding efficiency gains given by exploiting the correspondence of the motion of blocks in the same frame.

The present invention includes a method for the detection of the predominant motion characteristic for a current frame with respect to a reference frame. This method entails a low-resolution exhaustive full search of the reference frame for every block in the current frame. The results of this search are analysed using a histogram technique to identify the dominant motion component for the frame. This method is referred to as global motion component estimation.

Global motion component estimation comprises the steps of:

1) Sub-sampling the current frame and the reference frame in each direction. Sub-sampling can be done using any resolution in each direction, where X is the horizontal direction and Y is the vertical direction. The preferred sub-sampling is by 8 times in each direction. In this case, each pixel in the sub-sampled frames corresponds to an 8×8 pixel block in the current and reference frames. The preferred filter is an 8×8 averaging filter, but any 8×8 decimation filter would be equally appropriate.

Figure 9:
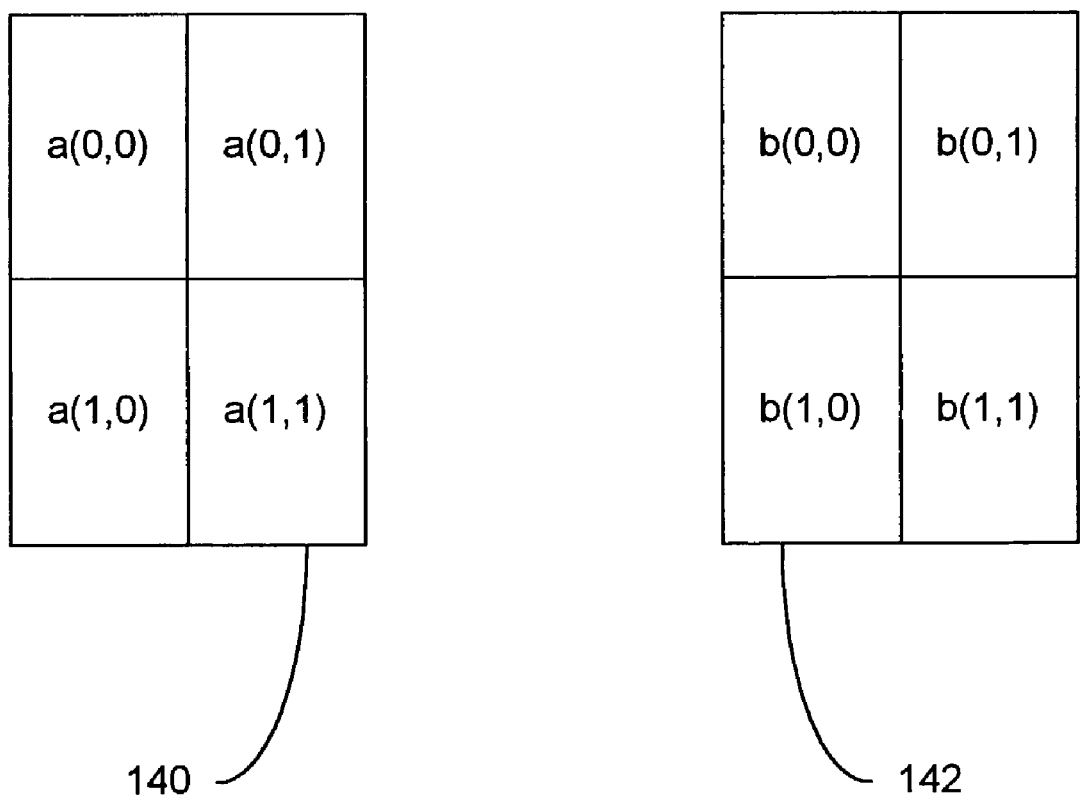
FIG. 9 is a plan view of a sub-sampled block from a current frame and a sub-sampled block from a reference frame.

2) For the first N×M block in the sub-sampled current frame find the N×M block in the sub-sampled reference that gives the lowest value of SAD distortion measure. Any size of block that is small compared to the sub-sampled frames is appropriate for this method. The preferred size is 2×2. FIG. 9 shows a sub-sampled current frame block 140 and a sub-sampled reference frame block 142. For the blocks 140 and 142 shown in FIG. 9, the SAD operation is:

$$SAD = \sum_{i=0}^{N} \sum_{j=0}^{M} |a(i, j) - b(i, j)|$$

Any other distortion measure is equally appropriate for this method.

3) The motion vector that results in the best matching 2×2 sub-sampled reference block is stored for later analysis.

4) Steps 2 and 3 are repeated for each block in the sub-sampled current frame.

5) The list of motion vectors obtained by step 3) is analysed to identify the dominant motion components. There are many appropriate methods for analysing the list of motion vectors to determine the dominant motion components, including many well known clustering techniques for example K-Means or a histogram. The preferred method for analysis of the list of motion vectors is through the following histogram technique:

a) Each motion vector is entered into a histogram, where the bin resolution of the histogram corresponds to a pixel block of size corresponding to the sub-sampling of step 1).

b) A peak detection algorithm is applied to identify the highest peaks in the histogram. The position of each such peak corresponds to a significant motion component of the current frame.

c) The motion components are scaled by the appropriate factors to compensate for the change in resolution resulting from the sub-sampling of step 1). For the preferred 8 times sub-sampling case, the motion components would be scaled by a factor of 8 in each dimension to reflect the motion component on the correct scale for the full resolution current and reference frames. These are used as discussed earlier by the FSBM modules.

Figure 10:
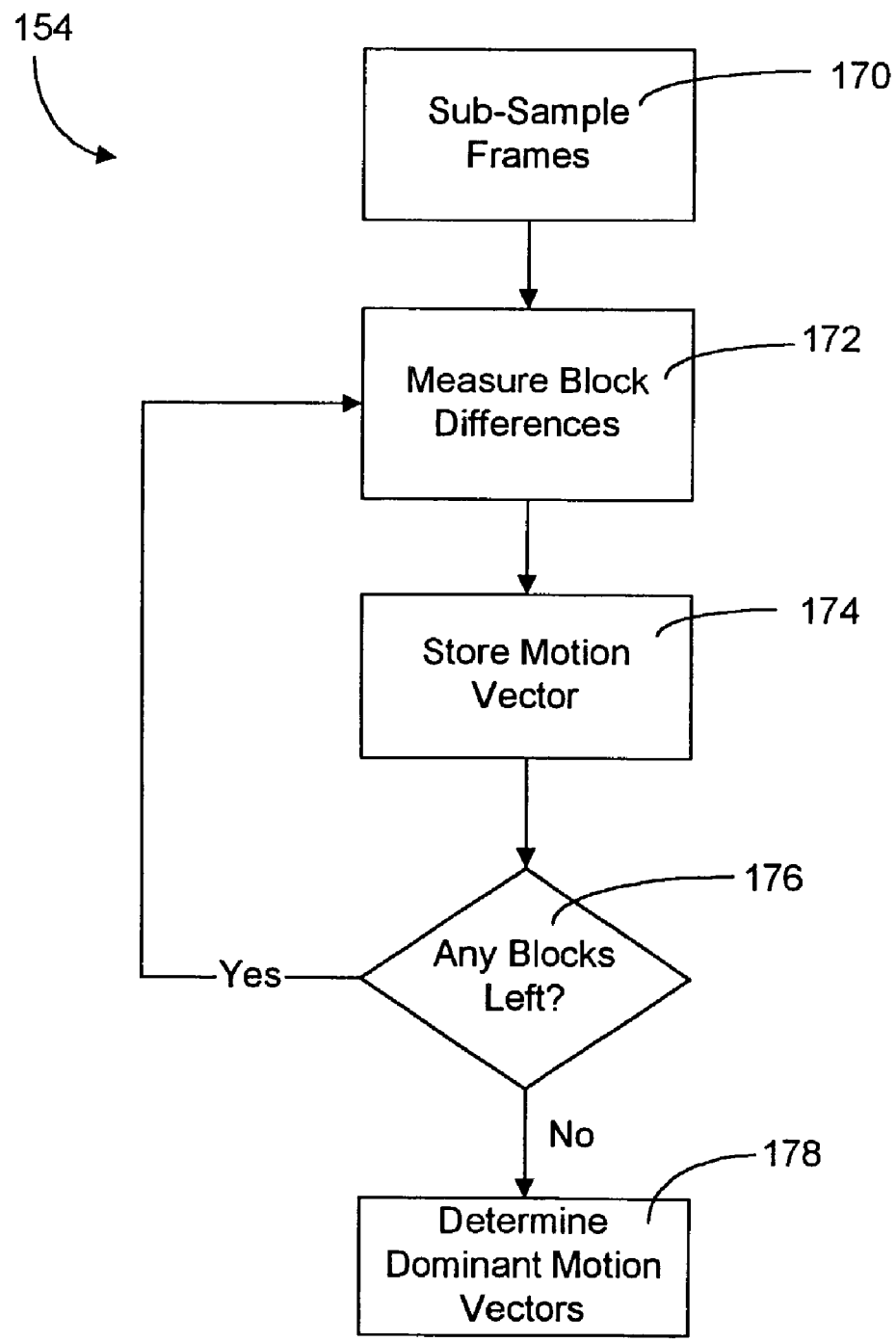
FIG. 10 is a flowchart of the global motion component estimation process.

Referring now to FIG. 10 a flowchart of the global motion component estimation process is shown generally as 154. FIG. 10 expands upon step 154 of FIG. 8. In process 154, steps 170, 172, 174, 176, and 178 correspond to steps 1, 2, 3, 4, and 5 described above.

Although the present invention has been described as being implemented in software, one skilled in the art will recognize that it may be implemented in hardware as well. Further, it is the intent of the inventors to include computer readable forms of the invention. Computer readable forms meaning any stored format that may be read by a computing device.

Although the present invention has been described with reference to certain specific embodiments, various modifications thereof will be apparent to those skilled in the art without departing from the spirit and scope of the invention as outlined in the claims appended hereto.

We claim:

1. A method for motion estimation comprising the steps of:
   a) acquiring pixel data for a current frame and pixel data for a reference frame;
   b) generating a plurality of dominant motion component offset vectors;
   c) searching within a plurality of search windows, one search window associated with each dominant motion component offset vector, for a block in a current frame;
   d) determining a best result from step c); and
   e) repeating steps c) and d) for each block in said current frame.

2. The method according to claim 1 wherein step b) comprises the steps of:
   i) sub-sampling said current frame to create a plurality of first sub-sampled blocks and sub-sampling said reference frame to create a plurality of second sub-sampled blocks;
   ii) comparing each first sub-sampled block with each second sub-sampled block to determine a best match for each of said plurality of first sub-sampled blocks and storing said best match for each of said plurality of first sub-sampled blocks; and
   iii) analyzing each best match for each of said plurality of first sub-sampled blocks to determine said plurality of dominant motion component offset vectors.

3. The method according to claim 1, wherein said searching at step c) utilizes Full Search Block Matching (FSBM).

4. The method according to claim 1, wherein step d) utilizes a block matching cost function.

5. The method according to claim 4, wherein said block matching cost function comprises a measurement of an amount of distortion between said block in said current frame and a block in one of said plurality of search windows in said reference frame.

6. The method according to claim 4, wherein said block matching cost function comprises a measurement of a penalty based on a candidate motion vector and the dominant motion component offset vector associated with a search window.

7. The method according to claim 2, wherein said sub-sampling comprises sub-sampling by a first factor in a horizontal direction and a second factor in a vertical direction.

8. The method according to claim 7, where said first factor and said second factor each have a value of eight.

9. The method according to claim 2, wherein said sub-sampling creates a sub-sampled element having a first dimension in a horizontal direction and a second dimension in a vertical direction.

10. The method according to claim 9, wherein said first dimension and said second dimension each have a value of two.

11. The method according to claim 2, wherein step ii) utilizes a Sum of Absolute Differences (SAD) to determine said best match.

12. The method according to claim 11, wherein said SAD is defined as:

$$SAD = \sum_{i=0}^{N} \sum_{j=0}^{M} |a(i, j) - b(i, j)|.$$

13. The method according to claim 2, wherein step iii) comprises entering said best match for each of said plurality of first sub-sampled blocks into a histogram.

14. The method according to claim 13, further comprising the step of scaling said dominant motion component offset vectors by a first factor in a horizontal direction and by a second factor in a vertical direction.

15. The method according to claim 4, wherein said block matching cost function comprises a sum of a distortion measurement and a penalty associated with selection of a particular motion vector.

16. The method according to claim 5, wherein said measurement of said amount of distortion between said block in said current frame and said block in one of said plurality of search windows in said reference frame comprises a Sum of Absolute Differences (SAD).

17. The method according to claim 6, wherein said measurement of said penalty comprises an estimate of a number of bits to encode prediction parameters for said block in said current frame.

18. The method according to claim 13, wherein step iii) further comprises detecting peaks in said histogram to determine said dominant motion component offset vectors.

19. The method according to claim 1, wherein said plurality of search windows are searched simultaneously.

20. A computer readable medium containing computer instructions, when executed by a computer to perform the method according to claim 1.

* * * * *